March 19, 1935.   J. H. NELSON   1,995,217
WATERING FLOWER POT
Filed Jan. 4, 1934
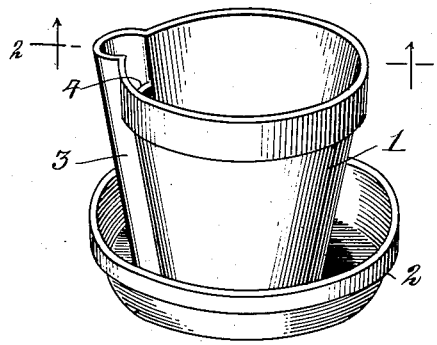
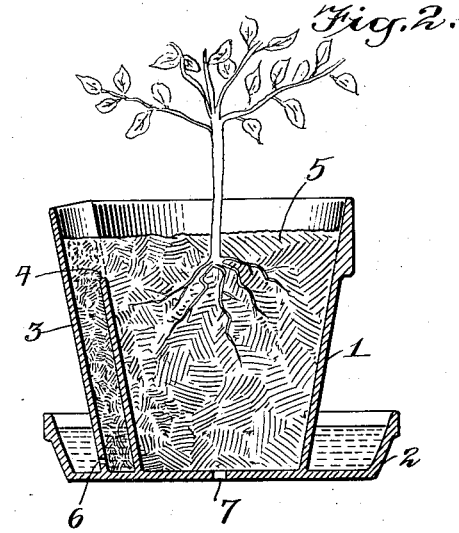
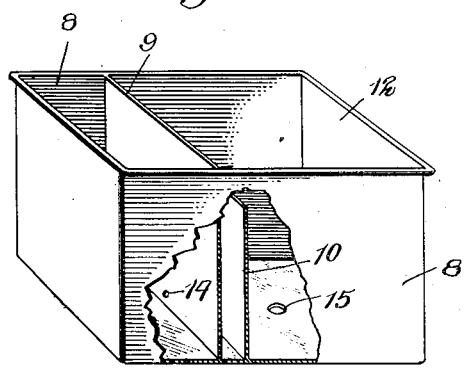
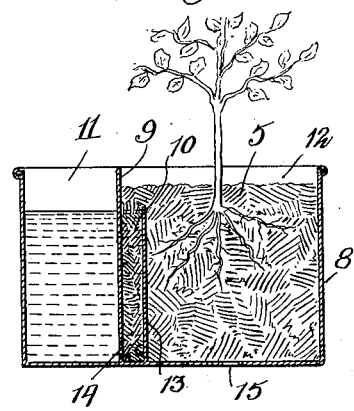
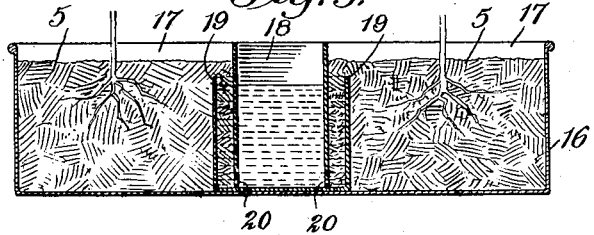
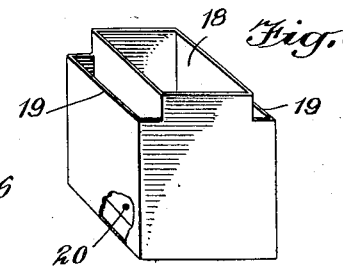
INVENTOR
John H. Nelson
BY
Munn, Anderson, Stanley, Foster & Liddy
ATTORNEYS
WITNESSES Patented Mar. 19, 1935

1,995,217

UNITED STATES PATENT OFFICE 1,995,217

WATERING FLOWER POT

John H. Nelson, Brooklyn, N. Y.

Application January 4, 1934, Serial No. 705,289

1 Claim. (Cl. 47—38)

This invention relates to watering flower pots, and this title is employed in its broadest sense to include what is generally known as flower pots, flower boxes or receptacles of any sort which contain earth and growing plants.

An object of the invention is to provide improved means for moistening the earth in the receptacle and maintaining the earth properly moistened for a period of time.

A further object is to provide a device of this character in which the water passes from the water receptacle into contact with earth or other suitable material, such as sand, small gravel and the like, in an irrigating conduit, with the earth in the receptacle extending across and bridging the upper end of the conduit so that the earth or other material in the conduit conveys the moisture by capillary attraction from the lower end of the conduit to the upper end thereof and across the conduit through the earth, which bridges the same.

With these and other objects in view, the invention consists in certain novel features of construction and combinations and arrangements of parts, all of which will be more fully hereinafter described and pointed out in the claim.

In the accompanying drawing—

Figure 1 is a perspective view illustrating my invention as applied to a flower pot Figure 2 is a view in vertical section on the line 2/2 of Figure 1;

Figure 3 is a perspective view partly broken away and in section, illustrating my invention as applied to a flower box;

Figure 4 is a view in longtudinal section of the box shown in Figure 3;

Figure 5 is a view in longitudinal section illustrating my invention as applied to a flower box, with the moistening device in the center of the box; and Figure 6 is a perspective view partly broken away, illustrating the moistening device shown in Figure 5.

Referring to Figures 1 and 2 of the drawing, 1 represents the flower pot and 2 an annular receptacle around the base of the pot 1 and integral therewith. The pot 1 is made or formed with an integral irrigating conduit 3 which extends longitudinally of the pot and is preferable at the outside of the pot, with the inner wall 4 of said conduit terminating appreciably below the top of the pot so that the earth 5, located in the pot, extends across the upper end of this wall 4, thus bridging the upper end of the conduit and also filling the conduit.

The receptacle 2 is adapted to serve as a water reservoir and the outer wall of the conduit 3 adjacent its lower end within the receptacle 2 is formed with relatively small opening 6, which will allow the water to enter the lower end of the conduit, wetting the earth or other material in the conduit, and this material in the conduit will convey the moisture by capillary attraction to the upper portion of the earth 5 in the pot 1 and maintain the earth properly moistened for the plant.

I preferably provide a small opening 7 in the bottom of the pot, as is customary, and as above stated while I have illustrated in Figures 1 and 2 of the drawing the particular shape of pot it is to be distinctly understood that the invention is not limited to this particular shape, as the design of the pot may be varied to suit the trade.

In the form of my invention illustrated in Figures 3 and 4 of the drawing, 8 represents a flower box which is divided by two parallel spaced partitions 9 and 10. The compartment 11 between the partition 9 and the end of the box constitutes a reservoir for water; the compartment 12 between the partition 10 and the other end of the box 8 constitutes a receptacle for earth 5, and the space between the partitions 9 and 10 constitutes an irrigation conduit 13. The partition 10 constituting a wall of the conduit terminates appreciably below the upper edge of the box so that the earth in the box extends across the upper end of this partition, bridging the upper end of the conduit and filling the conduit. The partition 9 has a relatively small opening 14 at or near its lower end through which the water passes into the conduit. An opening 15 is preferably provided in the bottom of the earth compartment 12 of the box.

In the modification illustrated in Figures 5 and 6 of the drawing, 16 represents a relatively long box having earth compartments 17 at its ends and a water reservoir 18 located at the center of the box. This reservoir 18 is provided at both of its sides with irrigating conduits 19 which terminate appreciably below the upper end of the box so that the earth 5 in the box bridges the upper ends of the conduits and fills the conduits. Small openings 20 are provided in the lower portions of the reservoir 18 communicating with the conduits to permit water to pass into the conduits. This moistening apparatus illustrated in Figures 5 and 6 of the drawing may constitute a permanently secured part of the flower box or it may be a removable device.

While I have illustrated several forms of my invention I would have it understood that various slight changes may be made with regard to the form and arrangement of parts without departing from my invention, and hence I do not limit myself to the precise details set forth but consider myself at liberty to make such changes and alterations as fairly fall within the spirit and scope of the claim.

What I claim is:

A device of the character described, comprising a receptacle, a water containing reservoir in the receptacle and of the same vertical dimension as the receptacle, a vertical wall spaced from the wall of the reservoir and of less height than the reservoir and receptacle, and forming an irrigating conduit, the reservoir having an opening in the lower portion of its wall communicating with said conduit, and said receptacle having a drain opening in its bottom.

JOHN H. NELSON.